United States Patent [19]

Bains

[11] 4,251,969
[45] Feb. 24, 1981

[54] PANEL JOINT

[75] Inventor: Gurdip S. Bains, Bonneauville, Pa.

[73] Assignee: Westinghouse Electric Corp., Pittsburgh, Pa.

[21] Appl. No.: 80,972

[22] Filed: Oct. 2, 1979

[51] Int. Cl.³ .............................................. E04C 1/10
[52] U.S. Cl. ........................................ 52/584; 52/712
[58] Field of Search ................. 52/584, 589, 586, 580, 52/284, 582, 127, 712; 403/335, 338

[56] References Cited

U.S. PATENT DOCUMENTS

| 3,143,195 | 8/1964 | Schroeder, Jr. | 52/284 X |
| 3,332,182 | 7/1967 | Mark | 52/584 X |
| 3,439,465 | 4/1969 | DuPre | 52/584 |
| 3,683,576 | 8/1972 | Sikes | 52/580 X |
| 3,731,956 | 5/1973 | Hanley | 52/582 |
| 3,894,377 | 7/1975 | Wetch | 52/584 |

Primary Examiner—Carl D. Friedman
Attorney, Agent, or Firm—D. R. Lackey

[57] ABSTRACT

A panel joint for joining a non-metallic panel member and a metallic panel member. A metallic joining member having elongated slots, and metallic spacer members fixed to the non-metallic panel member, cooperate to clamp the metallic panel member to the non-metallic panel member, with the orientation of each slot and a tapered transition on each spacer member providing first and second different clamping forces in response to a predetermined vertical movement of the joining member.

6 Claims, 4 Drawing Figures

PANEL JOINT

BACKGROUND OF THE INVENTION

1. Field of the Invention

The invention relates in general to panel joints, and more specifically to panel joints for joining a metallic panel member to a non-metallic panel member, such as wood.

2. Description of the Prior Art

Metallic panel members are often required to be joined together with non-metallic panel members, such as wood or imitations thereof, to form a room or cubicle, and it is essential that the joining hardware be concealed. Thus, the joining hardware must be applied to the back sides of the panels, i.e., those surfaces outside of the cubicle. Further, these applications may require the room or cubicle to be assembled within a space which denies direct access to the back sides of the panels, once they are placed in an upstanding adjacent position preparatory to the joining step. An example of such an application is the assembly of a wood elevator cab having metallic return posts and metallic door strike jambs on a platform in the hatch or hoistway of a building. The panels which form the cab are located about one inch from the sides of the platform, and the platform is usually so close to the walls of the hoistway that an assembler would find it difficult or impossible to work between the panels and the hoistway walls. Typical spacings between the platform and hoistway walls are two inches between the platform and front and back walls, and eight inches between the platform and the side walls.

A common prior art arrangement for joining metallic panel members to non-metallic panel members utilizes screws, and thus the metallic panel members must be joined to the non-metallic members before placing them on the elevator platform, in order to gain access to the locations of the screws. The use of screws may also result in joints which are not as tight as desired, especially after the elevator cab has been subjected to vibration during usage thereof, as the wood cabs with metallic strike jambs and posts are assembled at the factory, disassembled for shipment, and reassembled on the elevator car platform in the hatch, using the same screw holes used at the factory.

It would thus be desirable to provide a new and improved panel joint for assembling metallic panel members to non-metallic panel members which enables the panel members to be quickly and tightly joined with a joint which is uniform and tight along its complete length. Further, the joint must be such that it will stay tight during usage, even when subjected to movement, such as in the hereinbefore-mentioned elevator cab application.

Still further, the panel joint must permit assembly in locations which have very little space adjacent to the back sides of the panels, with the panel members being quickly joined without requiring skewing or turning of the panels, and without requiring an assembler to be positioned adjacent to the back sides of the panels.

SUMMARY OF THE INVENTION

Briefly, the present invention is a new and improved panel joint for joining an upstanding metallic panel member to an upstanding non-metallic panel member, which joint does not require direct access to the rear sides of the panels during assembly. The non-metallic panel member, which has front and back surfaces, side edges, and top and bottom edges, includes a plurality of metallic spacer members fixed to its back surface, adjacent to the side edge thereof to be joined to the metallic panel member. The back and front surfaces, respectively, of the non-metallic panel member form first and second outside corners at their intersections with the side edge to be joined.

The plurality of metallic spacer members each include head and shank portions, and a tapered transition portion therebetween.

The metallic panel member is bent into a right angle configuration which includes first and second leg portions which form inside and outside corners at their intersection. The inside corner is nested against the first outside corner of the non-metallic panel member such that the first and second leg portions contact the rear surface and side edge, respectively, of the non-metallic panel member. The first leg portion includes openings located and sized such that the metallic spacer members fixed to the non-metallic panel member each extend through one of the openings without interference, enabling the first leg portion to lie flat against the rear surface of the non-metallic panel member.

An upstanding right angle metallic joining member having upper and lower ends includes first and second leg portions which define inside and outside corners, with the first leg portion having a plurality of vertically-spaced, elongated slots having an enlarged spacer head receiving portion at one end and a narrower spacer shank-receiving portion in communication therewith. The elongated slots are oriented such that the longitudinal dimension of the slot is tilted or angled slightly from a vertical center line drawn between the upper and lower ends of the adjoining member, with the upper end of each slot being closer to the inside and outside corners of the right angle configuration than the lower end of the slot. The enlarged spacer head receiving portion is located at the bottom end. The right angle joining member is disposed such that its inside corner nests on the outside corner of the metallic panel member, with the heads of the spacer members entering the enlarged spacer head receiving portions of the slots, and with the upper end of the joining member slightly projecting above the top edges of the panel members to be joined. Once the spacer heads enter the enlarged portions of the slots, a vertically directed downward force is applied to the upper end of the joining member, such as by striking the upper end with a hammer. The tapered transition of each spacer member cooperates with the narrow portion of a slot to cause the first leg portion of the joining member to be forced towards the rear surface of the non-metallic panel member, while the slight angle between the longitudinal axis of the slots and the vertical longitudinal center line of the joining member simultaneously draws the second leg of the joining member towards the side edge of the non-metallic panel member. Thus, the first and second leg portions of the metallic panel member are tightly clamped between the joining member and non-metallic panel member, creating a tight, uniform joint from top to bottom which will maintain its tightness during usage, notwithstanding movement and vibration of the joint.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

The invention is a new and improved panel joint for joining a metallic panel member to a non-metallic panel member which facilitates the assembly of such panel members on a platform disposed in a hatch to form the cab of an elevator car, and the invention will be described in this context.

Figure 1:
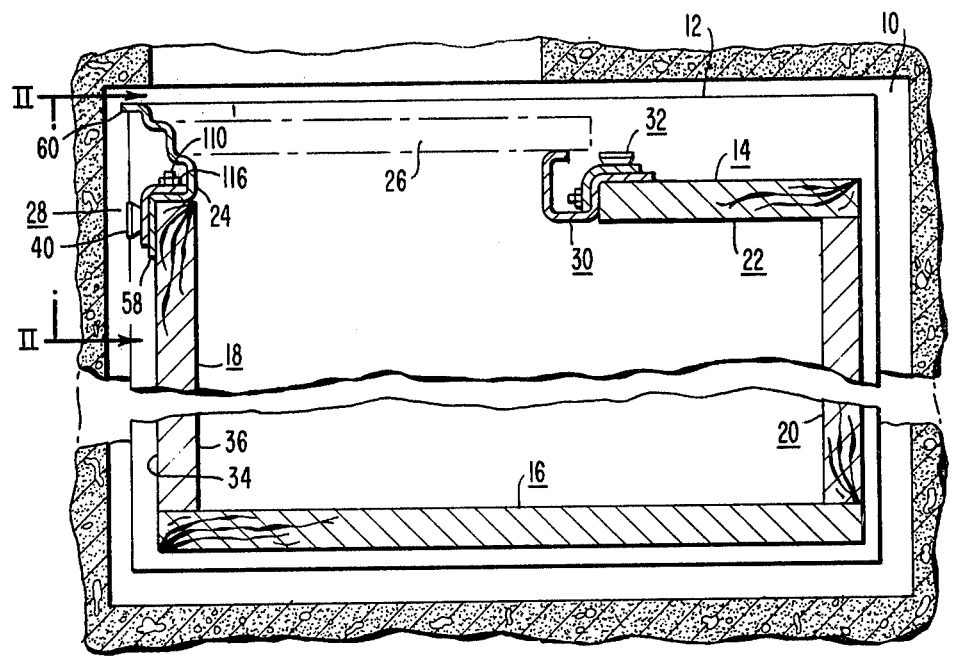
FIG. 1 is a plan view, in section, of an elevator cab disposed in a hatch or hoistway, illustrating two panel joints constructed according to the teachings of the invention wherein metallic panel members are securely joined to non-metallic panel members.

FIG. 1 is a plan view, in section, of an elevator hatch or hoistway 10, an elevator platform 12 disposed in hatch 10, and an elevator cab 14 disposed on platform 12 which utilizes new and improved panel joints constructed according to the teachings of the invention. Basically, elevator cab 14 is a non-metallic cab having a rear wall 16, first and second side walls 18 and 20, respectively, and a front wall 22, all formed of non-metallic panel members, such as wood, or a wood substitute, and as such having relatively thick walls, such as 0.88 inch thick. The non-metallic panel members may be joined by any suitable joining arrangement, such as disclosed in co-pending Application Ser. No. 936,298, filed Aug. 23, 1978, entitled, "Panel Joint", which application is assigned to the same assignee as the present application.

Figure 2:
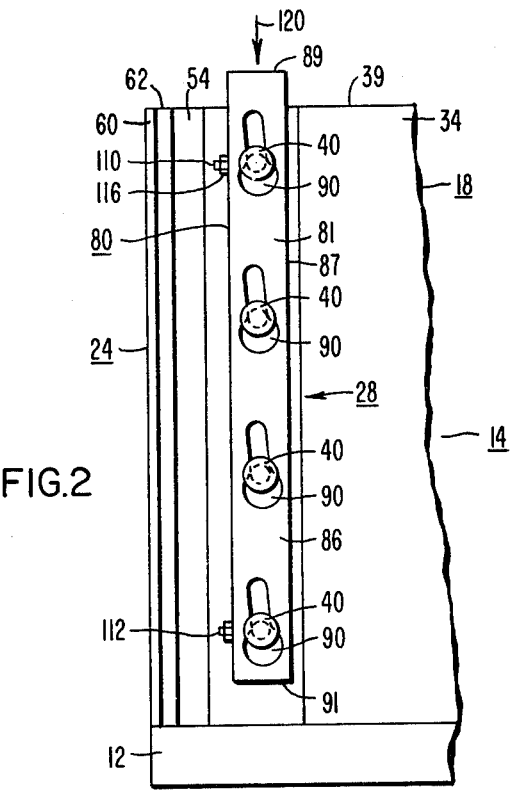
FIG. 2 is an elevational view of one of the metallic to non-metallic panel joints shown in FIG. 1, taken between and in the direction of arrows II—II in FIG. 1.
Figure 3:
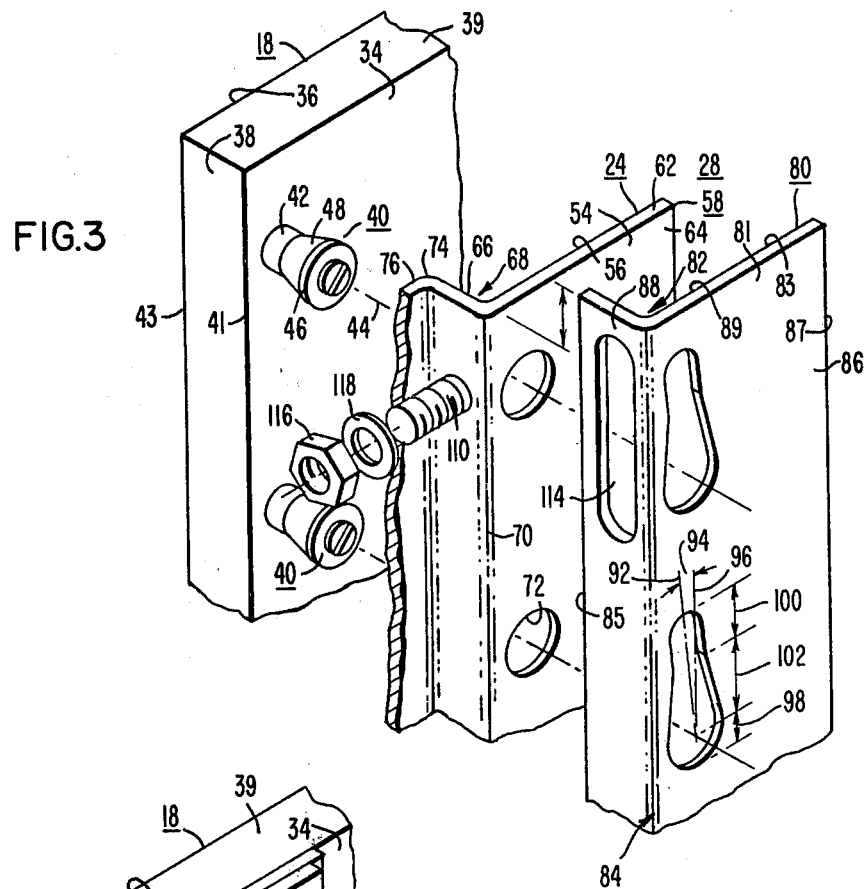
FIG. 3 is an enlarged, fragmentary, exploded, perspective view of the panel joint hardware and panel members of the joint shown in FIGS. 1 and 2, which more clearly illustrates the details of the panel joint hardware.
Figure 4:
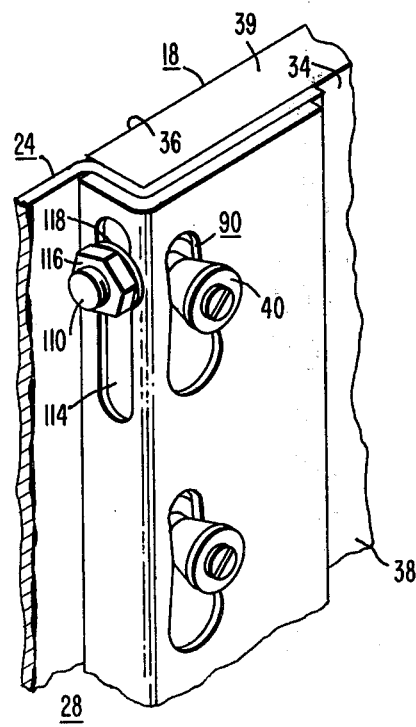
FIG. 4 is a perspective view which illustrates the joint shown in FIGS. 1, 2 and 3, after completion.

Non-metallic cabs, in addition to the non-metallic panel members, may utilize one or more metallic panel members which must be securely attached to the non-metallic panel members. A metallic panel member is much thinner than a non-metallic panel member but it must be securely attached to a metallic panel member while smoothly continuing the inner wall surface of the non-metallic panel member, without the use of noticeable hardware. As illustrated in FIG. 1, a metallic panel member 24, which functions as a strike jamb for a door 26, shown in phantom, is attached to non-metallic panel member 18 with a first panel joint arrangement 28 constructed according to the teachings of the invention. Further, a metallic panel member 30, which functions as a return post for door 26, is attached to non-metallic panel member 22 with a second panel joint 32 constructed according to the teachings of the invention. Since panel joints 28 and 32 are similar, only panel joint 28 will be described in detail. In addition to FIG. 1, the remaining figures will also be referred to when describing panel joint 28, with FIG. 2 being an elevational view of panel joint 28 taken between and in the direction of arrows II—II in FIG. 1. FIG. 3 is an exploded, fragmentary, perspective view of panel joint 28, and FIG. 4 is a perspective view of panel joint 28 after completion thereof.

Non-metallic panel member 18, which forms an upstanding first side member of elevator cab 12, is formed from a suitable non-metallic material such as wood, plastic, and the like, having a predetermined thickness dimension, such as 0.88 inch. As best shown in FIG. 3, panel member 18 has first and second major opposed surfaces 34 and 36, respectively, which form the rear or outside, and inside surfaces, respectively, of the elevator cab 14. Panel member 18 further includes vertically-extending side edges, such as side edge 38, and horizontally-extending upper and lower edges, such as upper or top edge 39. The intersections of side edge 38 with surfaces 34 and 36 define first and second outside corners 41 and 43, respectively.

A plurality of spacer members 40, which form a first portion of the joint hardward for panel joint 28, are mounted on rear surface 34 of non-metallic panel member 18. Each of the spacer members 40 is a metallic member, formed of a suitable material such as steel, including a smooth, round shank portion 42 having a predetermined diameter such as about 0.5 inch. The shank portion 42 has a length dimension in the direction of a longitudinal axis 44 which is substantially the same as the thickness dimension of panel member 24, such as 0.075 inch, plus the thickness dimension of a metallic right angle joining member, to be hereinafter described.

Spacer member 40 further includes a smooth, round head portion 46 having a predetermined diameter, such as about 0.75 inch. Instead of shank 42 and head 46 joining at right angles relative to one another, it is important to note that an angled or tapered cam surface 48 provides a tapered transition between the shank 42 and head 46. Surface 48 intersects shank portion 42 at a predetermined angle, such as an angle of about 25°.

Spacer member 40 is secured to surface 34 of panel member 18 via suitable fastener means. For example, each of the spacer members 40 may have an opening coaxial with its longitudinal axis, and a screw 50 may be inserted through the opening of spacer member 40 which threadably engages a small pilot hole pre-drilled into the non-metallic panel member 18.

A plurality of spacer members 40 are attached to surface 34 of panel member 18, with the centers of the spacer members 40 being vertically spaced from one another on a common vertical imaginary line which is spaced from and parallel with the side edge 38 of panel member 18.

The metallic panel member 24, which is joined to the non-metallic panel member 18 via panel joint 28, is formed of a suitable metal, such as steel, having a predetermined thickness dimension such as 0.075 inch. Panel member 24 has first and second major opposed surfaces 54 and 56, vertically extending side edges 58 and 60, and horizontally extending upper and lower edges, such as upper or top edge 62.

Panel member 24 is bent into a first right angle configuration adjacent to side edge 58, with the right angle configuration having first and second leg portions 64 and 66, respectively, which define inside and outside corners 68 and 70, respectively. The first leg portion 64 is disposed against the rear surface 34 of the non-metallic panel member 18, with the horizontal length of the first leg portion 64 being selected to extend past the locations of spacer members 40. Openings 72 are provided in the first leg portion 64, with the openings being located and sized such that when the first leg portion 64 is in the desired position against surface 34, each of the spacer members 40 will project through an opening 72, without interference.

The horizontal length of the second leg portion 66 depends upon the configuration of the metallic panel member 24. Its horizontal length is at least equal to the width dimension of the non-metallic panel member 18. If surface 56 of the metallic panel member is to form a smooth continuation of surface 36 of the non-metallic panel member, i.e., both surfaces are to lie in a common plane, panel member 24 would include a second right angle bend 74 shown in the Figures in order to form a leg portion 76 having its surface 56 in the plane of surface 36 of the non-metallic panel member 18.

The panel joint hardware, which includes spacer members 40, is completed by a metallic joining member 80 formed of a sheet of suitable metal, such as steel, having a predetermined thickness dimension, such as 0.090 inch. The metallic sheet has first and second major opposed surfaces 81 and 83, respectively, side edges 85 and 87, and upper and lower edges 89 and 91, respectively. Joining member 80 includes a right angle bend having inner and outer corners 82 and 84, respectively, which corners are formed by the intersection of first and second leg portions 86 and 88, respectively.

A plurality of spaced, elongated slots or openings 90 are provided in the first leg portion 86 of the right angle joining member 80, with the longitudinal axes 92 of slots 90 each being offset by a predetermined angle 94 from a longitudinal axis 96 which extends between the upper and lower ends of joining member 80. Each of the slots 90 includes an enlarged portion 98 on the end of the slot which faces the lower end of the joining member 80, which enlarged portion is sized to accept the diameter of head portion 46 of spacer member 40. Each of the slots 90 further includes a narrow portion 100 which starts from a half-circle at its upper end and has parallel sides sized to snuggly accept the shank 42 of a spacer member 40. Each of the slots 90 preferably includes a tapered transition 102 between the enlarged portion 98 and the narrow portion 100, to facilitate capturing a spacer member 40 in each slot. Thus, enlarged portion 98 of each slot 90 has the configuration of a half-circle. Alternatively, if the tapered transition is not desired, the enlarged portion 98 would have its circular configuration continued beyond that of a half-circle, until it intersects the sides of the narrower portion 100.

In a preferred embodiment of the invention, the right angle joining member 80 is slidably fixed to metallic panel member 24 at the factory. This pre-assembly of joining member 80 to the metallic panel member 24 facilitates field assembly of the metallic panel member 24 to the non-metallic panel member 18.

For example, as illustrated in the Figures, threaded studs 110 and 112 may be welded to surface 54 of the second leg portion of panel member 24, suitably spaced from the upper and lower edges, respectively, of panel member 24.

Vertically oriented, elongated slots are provided in the second leg portion 88 of joining member 80 for receiving studs 110 and 112, such as slot 114 for receiving stud 110.

Joining member 80 is nested with panel member 24 such that studs 110 and 112 extend through the cooperative slots, and nut and washer combinations, such as nut 116 and washer 118, secure joining member 80 to panel member 24.

The studs 110 and 112 and cooperative slots are located such that when joining member 80 is lifted vertically to its uppermost position relative to panel member 24, and snagged with nuts 116, the enlarged portions 98 of slots 90 in joining member 80 will be aligned with openings 72 in panel member 24.

Nuts 116 are tightened to the point of holding joining member 80 in the desired position without allowing it to slide downwardly under its own weight. However, it is not tightened such that joining member 80 cannot be easily forced vertically downward relative to panel member 24, by striking the upper end of the joining member 80 a vertically downward blow with a hammer, as illustrated by arrow 120 in FIG. 2.

In assembling panel joint 28, the non-metallic panel member 18 is placed in the required upstanding position, and the pre-assembled metallic panel member 24 and joining member 80 are disposed in an upright position adjacent to the non-metallic panel member 18. An assembler, located on side 36 of non-metallic panel member 18 positions the first leg portion 64 of the metallic panel member against surface 34 of the non-metallic panel member such that spacer members 40 extend through the aligned openings 72 and slots 90. The inside corner 68 of the metallic panel member 24 is nested against the outside corner 41 of the non-metallic panel member, and the second leg portion 66 of the metallic panel member 24 is placed against edge 38 of the non-metallic panel member 18.

It is a simple matter for the assembler to engage the heads of spacer members 40 in openings 72 and slots 90, especially if the tapered transition 102 is utilized, as the tapered transition 102 cooperates with the tapered transition 48 of the spacer members 40 to easily start the spacer members and slots to the correct relative positions.

The slots 90 are located, and the joining member 80 dimensioned, such that when the spacer members 40 enter the enlarged portions 98 of slot 90, the upper end 89 of joining member 80 will be located above the upper edges 39 and 62 of panel members 18 and 24, respectively. The assembler then merely strikes the upper end 89 of joining member 80 with a hammer, with a vertically-descending blow, to complete the panel joint 28. Hammering joining member 80 downwardly, results in a two-way clamping effort. The first leg portion 86 of joining member 80 is forced toward surface 34 of panel member 18 as the tapered transitions 102 and 48 of slots 90 and spacers 40, respectively, cooperate to force the sides of the slots 90 into the shank portion 42 of the spacer members. This results in tightly clamping the first leg portion 64 of panel member 24 between surfaces 34 and 83 of panel member 18 and joining member 80. Further, the angle 94 of the slots 90 relative to the longitudinal axis 96 of joining member 80 forces the second leg portion 88 of joining member 80 towards edge 38 of non-metallic panel member 18. Thus, the second leg portion 66 of the metallic panel member 24 is tightly clamped between the second leg portion 88 of joining member 80 and surface or edge 38 of panel member 39.

In summary, there has been disclosed a new and improved panel joint which enables a metallic panel member to be quickly and easily joined and locked, to a non-metallic panel member, while requiring access to only one side of the panel joint. All of the permanently fixed panel joint hardware is located on the rear surface of the non-metallic panel member, with no hardware being required to be permanently fixed to the side edge of the non-metallic panel member. The panel joint is tight and uniform along its entire vertical length, and it remains tight notwithstanding movement and vibration of the panel joint during service. The panel joint may be easily disassembled, if required, by providing a block of metal on surface 81 near upper edge 89 of joining member 80, such as by welding a steel block in this position. This steel block may be struck on its lower surface with a hammer, to loosen the joint. This same block may be used when assembling the joint.

I claim as my invention:

1. A panel joint for joining a metallic panel member to a non-metallic panel member, comprising:

an upstanding non-metallic panel member having first and second major opposed surfaces, and a side edge which defines first and second upstanding outside corners at the intersections of said side edge with said first and second major surfaces, respectively, an upstanding metallic panel member including a right angle bend having first and second leg portions which define inside and outside corners at their intersection, with said inside corner being nested against the first outside corner of said non-metallic panel member, a metallic joining member including a right angle bend having first and second leg portions which define inside and outside corners at their intersection, with said inside corner being nested against the first outside corner of said metallic panel member, a plurality of openings and elongated slots in the first leg portions of the metallic panel member and joining member, respectively, with each opening in the metallic panel member being aligned with a slot in the joining member, each of said slots having first and second ends, and a longitudinal axis which extends therebetween, and a plurality of spacer members fixed to the first surface of said non-metallic panel member, with each spacer member projecting through an opening and an aligned slot of said metallic panel member and said joining member, respectively, said slots in the joining member having their longitudinal axes oriented such that a predetermined vertical movement of said joining member provides a camming action between the slots and spacer members which causes the second leg portion of the metallic panel member to be tightly clamped between the second leg portion of the joining member and the side edge of said non-metallic panel member.

2. The panel joint of claim 1 wherein the first end of each of the slots in the joining member is higher than its second end, and closer to the intersection of its first and second leg portions than second end, with the predetermined vertical movement which clamps the second leg portion of the metallic panel member between the second leg portion of the joining member and the side edge of the non-metallic panel member being a vertically downward movement.

3. The panel joint of claim 1 wherein the spacer members each include a shank portion, a head portion, and a tapered transition therebetween, with the tapered transition cooperating with a slot in the joining member in response to the predetermined vertical movement of the joining member to additionally clamp the first leg portion of the metallic panel member between the first leg portion of the joining member and the first major surface of the non-metallic panel member.

4. The panel joint of claim 1 wherein the non-metallic panel member and joining member each include upper and lower edges, with the predetermined vertical movement of the joining member which results in the clamping of the second leg portion of the panel member, being a vertically downward movement, and wherein the upper edge of adjoining member is disposed above the upper edge of the non-metallic panel member, at least until the metallic panel member is tightly clamped between the joining member and the side edge of the non-metallic panel member.

5. The panel joint of claim 1 wherein each of the slots in the joining member includes an enlarged portion sized to receive a spacer member, enabling the joining member to be applied notwithstanding prior attachment of the spacer members to the non-metallic panel member.

6. The panel joint of claim 1 including means slidably fixing the metallic joining member to the metallic panel member, such that the joining member may be moved in a vertical direction relative to the metallic panel member.

* * * * *